US012177617B2

(12) United States Patent
Raussi et al.

(10) Patent No.: US 12,177,617 B2
(45) Date of Patent: Dec. 24, 2024

(54) WIRELESS HEADSET WITH IMPROVED WIND NOISE RESISTANCE

(71) Applicant: Huawei Technologies Co., Ltd., Shenzhen (CN)

(72) Inventors: Tommi Raussi, Helsinki (FI); Jyri Pakarinen, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 17/880,380

(22) Filed: Aug. 3, 2022

(65) Prior Publication Data

US 2022/0377447 A1 Nov. 24, 2022

Related U.S. Application Data

(63) Continuation of application No. PCT/EP2020/052599, filed on Feb. 3, 2020.

(51) Int. Cl.
*H04R 1/08* (2006.01)

(52) U.S. Cl.
CPC ......... *H04R 1/086* (2013.01); *H04R 2420/07* (2013.01)

(58) Field of Classification Search
CPC ............................ H04R 1/086; H04R 2420/07
See application file for complete search history.

(56) References Cited

U.S. PATENT DOCUMENTS

| | | | | |
|---|---|---|---|---|
| 6,091,831 | A | 7/2000 | Cho | |
| 7,953,241 | B2 | 5/2011 | Jorgensen et al. | |
| 11,109,135 | B1 * | 8/2021 | Corona Aparicio . | H04R 1/1066 |
| 2002/0009206 | A1 | 1/2002 | Jorgensen et al. | |
| 2005/0058309 | A1 | 3/2005 | Poling et al. | |
| 2014/0072164 | A1 * | 3/2014 | Cohen .................... | H04R 1/086 29/527.1 |
| 2017/0034615 | A1 | 2/2017 | Mankodi et al. | |
| 2017/0245040 | A1 * | 8/2017 | Hankey .................. | H04M 1/05 |
| 2018/0121160 | A1 | 5/2018 | Boesen et al. | |

FOREIGN PATENT DOCUMENTS

| | | | |
|---|---|---|---|
| CN | 101277549 | A | 10/2008 |
| CN | 101959098 | A | 1/2011 |
| CN | 205029831 | U | 2/2016 |
| EP | 2271135 | A2 | 1/2011 |
| JP | 2005286850 | A | 10/2005 |

* cited by examiner

*Primary Examiner* — Suhan Ni

(74) *Attorney, Agent, or Firm* — Leydig, Voit & Mayer, Ltd.

(57) ABSTRACT

An earphone device and system for improving wind resistance protection as well as controllability of true wireless stereo (TWS) headsets are provided. The earphone device includes headset microphones in a housing facing outwards and configured to generate a microphone signal. The earphone device includes a control dial rotatably attached to the housing through a pivot. The dial is substantially flat and arranged to form a narrow gap between the housing and the dial. The dial is further arranged to cover each microphone, thereby providing wind and dirt protection but leaving a gap for the sound waves to reach the microphones.

19 Claims, 2 Drawing Sheets

WIRELESS HEADSET WITH IMPROVED WIND NOISE RESISTANCE

CROSS-REFERENCE TO RELATED APPLICATIONS

This application is a continuation of International Application No. PCT/EP2020/052599, filed on Feb. 3, 2020, the disclosure of which is hereby incorporated by reference in its entirety.

FIELD

The disclosure relates in general to the technical field of personal listening audio devices such as earphones, headphones and headsets, and in particular, to improving wind resistance protection of microphones in true wireless stereo (TWS) headsets.

BACKGROUND

With increased popularity of portable media players and mobile phones in recent years, the use of headphones has become commonplace. In the following disclosure, the term "headphones" will be used to refer to over-the-ear headphones as well as in-ear headphones or earbuds.

Headsets are a type of headphone comprising one or multiple microphones and can thus provide the equivalent functionality of a telephone handset with hands-free operation. Headsets are made with either a single-earpiece (mono) or a double-earpiece (mono to both ears or stereo). Among applications for headsets, besides use for communication, are aviation, theatre or television studio intercom systems, and console or personal computer (PC) gaming. In addition, the microphone(s) in such headsets can be used for active noise cancellation (ANC), which is an effective way to reduce the background noise and thereby improve the user's experience, especially in such cases where an acoustic seal (such as an in-ear headphone) is undesirable, and can even prove to be dangerous by blocking alerting sounds (such as an approaching vehicle) from the environment. ANC is a technique that aims to "cancel" unwanted noises, by introducing an additional, electronically controlled sound field referred to as anti-noise. The anti-noise is electronically designed so as to have the proper pressure amplitude and phase that destructively interferes with the unwanted noise or disturbance. An error sensor (such as a microphone) is provided in the headset housing to detect the so-called residual or error noise. The output of the error sensor is used by a control system to adjust how the anti-noise is produced, so as to reduce the ambient noise that is being heard by the user of the headset.

In such headphones including one or multiple microphones, such as true wireless stereo (TWS) headphones, microphone placement is often problematic. On the one hand, the microphones should be close to the user's mouth or have a directional pattern towards it (demand 1) for maximum uplink voice audibility. On the other hand, microphones should somehow be placed so that wind cannot easily enter the front cavity of a microphone (demand 2), which would cause wind noise.

Demand 1 has previously been solved either by a) using an extension of the headset body by a microphone boom, or b) by positioning two or more microphones in a way which the combined directional pattern of the microphone array (beamformer) creates amplification in the direction of the mouth. The drawback of the solution a) to demand 1 is the increased size of the device, which is typically unacceptable for modern TWS headphones.

A further drawback of several current TWS headsets is the lack of physical controls on the device itself, particularly, the lack of volume controls. Some devices use push buttons for controls, but their use is typically difficult for the user as the user cannot see the small buttons while operating the device. The ubiquitous volume knob would be a superior control, but the space limitations due to the small size of the device and the need for microphone locations for a good beamformer typically prevent this.

SUMMARY

Exemplary embodiments of the present disclosure provide an improved method and device for improving wind resistance protection of microphones in headsets which overcomes or at least reduces the problems mentioned above.

According to a first aspect, there is provided an earphone device comprising: a housing;

- at least one microphone arranged in the housing facing outwards and configured to generate a microphone signal;
- a dial rotatably attached to the housing through a pivot, the dial being substantially flat and arranged to form a narrow gap between the housing and the dial; wherein the dial is further arranged to cover the at least one microphone.

The combination of at least one microphone and a dial (control knob) in an earphone so that the microphones are located under the dial surface allows for improved wind protection. An additional benefit is that a proper large dial (control knob) can be used for the earphone which allows for improved user interface experience. Another additional benefit is that the user cannot accidentally touch the microphone front cavity openings when operating the earphone device (as often happens with existing solutions), thus reducing accidental handling noise. Another additional benefit is that all the above-mentioned benefits can be obtained while not increasing the overall size of the earphone unit.

In a possible implementation of the first aspect the at least one microphone comprises at least two microphones, wherein the at least two microphones are arranged to enable acoustic beamforming towards at least one of a mouth of a user or straight ahead of a user during use of the earphone device.

In a further possible implementation of the first aspect the housing is arranged with a substantially circular cross-section; and the at least one microphone comprises a plurality of angularly spaced apart microphones arranged around the circumference of the housing to enable enhancing the signal-to-noise ratio (SNR) of the microphone signal in certain directions, such as a mouth of a user or straight ahead of a user, during use of the earphone device.

In a further possible implementation of the first aspect the earphone device further comprises at least one microphone cavity extending from a surface of the housing towards the inside of the housing, the dial arranged to cover the opening of each microphone cavity, wherein each of the at least one microphone is arranged in a respective microphone cavity, thereby proving physical protection for the microphone(s).

In a further possible implementation of the first aspect the at least one microphone cavity further comprises a porous material arranged in a hollow space extending between the microphone and the surface of the housing, the porous material being a wind noise resistant material configured to filter out wind noise while allowing other sounds to pass through to the microphone. This combination further enables a more extensive use of (typically visually displeasing) porous wind-resistance material in front of the microphone front cavity, as porous material and microphones are hidden from the user under the dial.

In a further possible implementation of the first aspect at least the adjacent portions of the dial and the housing are arranged with circular cross-sections, with the pivot arranged to connect the central axes of the adjacent portions of the dial and the housing.

In a further possible implementation of the first aspect the dial is arranged with a larger diameter than the housing or at least the adjacent portion of the housing to the dial; and the dial further comprises a protruding rim extending in the direction of the housing and arranged to cover the gap but leaving a narrow opening between the edge of the housing and the rim to allow acoustic waves to reach the at least one microphone.

In a further possible implementation of the first aspect the pivot is arranged to limit the gap to a size small enough to hinder the entrance dust particles while allowing acoustic waves to reach the at least one microphone.

In a further possible implementation of the first aspect the earphone device further comprises a speaker configured to generate sound waves in response to an input audio signal; wherein the dial is a volume knob arranged to adjust at least one of the overall output level of the speaker or a balance between signal components of the input audio signal.

In a further possible implementation of the first aspect the signal components of the input audio signal comprise the microphone signal.

In a further possible implementation of the first aspect at least a portion of the housing is configured to fit into an ear canal or to substantially cover the opening of an ear canal of a user of the earphone device; the housing comprising a first side, and a second side opposite to the first side;

- wherein the at least one microphone is arranged in the housing facing outwards from the first side and configured to capture sound waves from the external environment;
- wherein the speaker is arranged in the housing facing outwards from the second side and configured to generate acoustic waves for delivery towards the inside of the ear canal; and
- wherein the dial is rotatably attached to the first side.

In a further possible implementation of the first aspect the earphone device further comprises an internal microphone arranged in the housing facing outwards from the second side and configured to capture sound waves from the direction of the auditory canal.

In a further possible implementation of the first aspect the earphone device further comprises a voice accelerometer configured to detect presence of the voice of a user of the earphone device via vibrations.

According to a second aspect, there is provided a system comprising:

- at least one earphone device according to any one of the possible implementations of the first aspect; and
- a host device arranged in data connection with the at least one earphone device.

Combining the earphone device in data connection with a host device allows for the earphone device to be implemented without own storage and processing means, resulting in a simpler construction that enables a small size and lighter weight, which are of high importance in the case of TWS headsets.

In a possible implementation of the second aspect the earphone device is a True Wireless Stereo (TWS) headset, the host device is a mobile smartphone, and the data connection is established using a Bluetooth protocol.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 1:
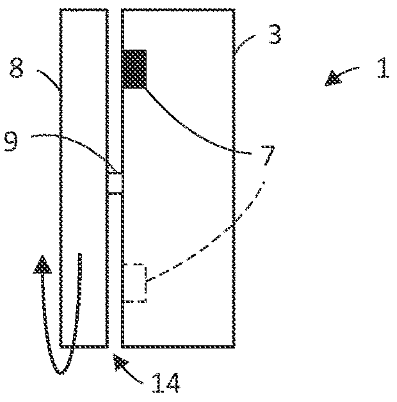
FIG. 1 shows a cross-section of an earphone device in accordance with an embodiment of the first aspect.

FIG. 1 illustrates an earphone device 1 according to the present disclosure. The earphone device 1 comprises a housing 3 and at least one microphone 7 arranged in the housing 3 facing outwards and configured to generate a microphone signal, based on captured sound waves. A substantially flat dial 8 (with a thickness substantially smaller than its diameter) is rotatably attached to the housing 3 through a pivot 9 in such a way to cover each of the at least one microphone 7 but also form a narrow gap 14 between the housing 3 and the dial 8 so that sound waves can reach the at least one microphone 7 from the environment. The pivot 9 may be arranged to limit the gap 14 to a size small enough to hinder the entrance dust particles while allowing acoustic waves to reach the at least one microphone 7.

Figure 2:
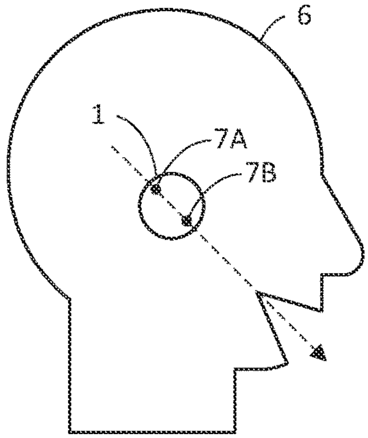
FIG. 2 illustrates a beamforming arrangement with two microphones in an earphone in accordance with another embodiment of the first aspect.

FIG. 2 illustrates an embodiment of the earphone device 1 comprising at least two microphones 7A, 7B, wherein the at least two microphones 7A, 7B are arranged to enable acoustic beamforming towards at least one of a mouth of a user 6 or straight ahead of a user 6 (as shown by the dashed line) during use of the earphone device 1. In this embodiment, the housing 3 may be arranged with a substantially circular cross-section like the dial 8.

In an embodiment (not illustrated) the earphone device 1 may comprise a plurality of angularly spaced apart microphones 7A, 7B arranged around the circumference of the housing 3 to enable enhancing the signal-to-noise ratio SNR of the microphone signal in certain directions, such as a mouth of a user 6 or straight ahead of a user 6, during use of the earphone device 1.

Figure 3:
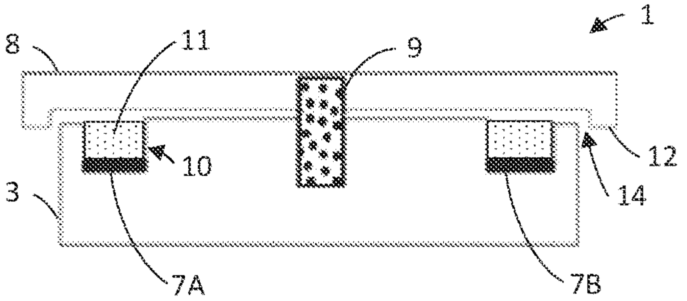
FIG. 3 shows a cross-section of an earphone device in accordance with another embodiment of the first aspect.

FIG. 3 illustrates an embodiment of the earphone device 1 where at least one microphone cavity 10 is extending from a surface of the housing 3 towards the inside of the housing 3 and the dial 8 arranged to cover the opening of each microphone cavity 10. Each of the at least one microphone 7 is arranged in a respective microphone cavity 10, thereby providing additional protection from physical forces. In the illustrated embodiment the at least one microphone cavity 10 further comprises a porous material 11 arranged in a hollow space extending between the microphone 7 and the surface of the housing 3, the porous material 11 being a wind noise resistant material configured to filter out wind noise while allowing other sounds to pass through to the microphone. As seen in FIG. 3, the porous material (dotted) is not visible to the user from the outside.

In some embodiments, as also shown in FIG. 3, the dial 8 and the housing 3 (or at least a portion of the housing 3 adjacent to the dial 8) are both arranged with a circular cross-section, with the dial 8 having a larger diameter than the housing 3 (or the adjacent portion of the housing 3). In such embodiments the dial 8 may further comprise a protruding rim 12 extending in the direction of the housing 3 and arranged to cover the gap 14 but leaving a narrow opening between the edge of the housing 3 and the rim 12 to allow acoustic waves to reach the at least one microphone, thereby protecting the microphones 7A, 7B from e.g. dust particles.

Figure 4:
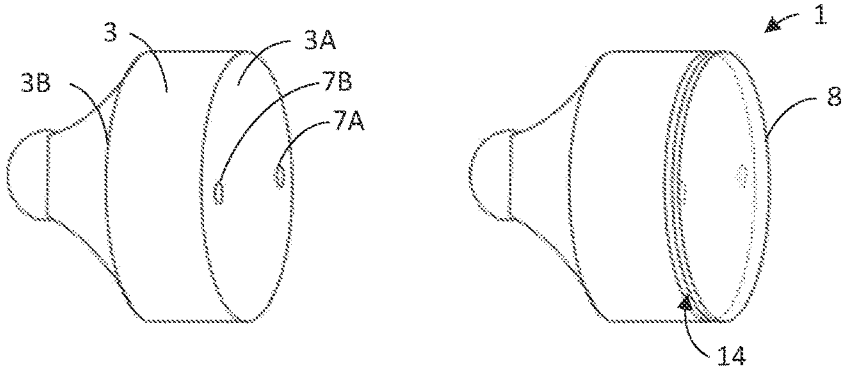
FIG. 4 shows a side view of an earphone device without and with a dial attached to its housing in accordance with another embodiment of the first aspect.

FIG. 4 illustrates an embodiment of the earphone device 1 where the dial 8 (only shown on the figure in the right, covering the microphones 7A,7B) and the housing 3 are arranged with substantially identical, circular cross-sections, with the pivot 9 (not shown here) arranged to connect the central axes of the dial 8 and the housing 3. Steps and features that are the same or similar to corresponding steps and features previously described or shown herein are denoted by the same reference numeral as previously used for simplicity. In some embodiments only adjacent portions of the dial 8 and the housing 3 are arranged with circular cross-sections, the pivot 9 arranged to connect these adjacent portions at approximately their central points.

Figure 5:
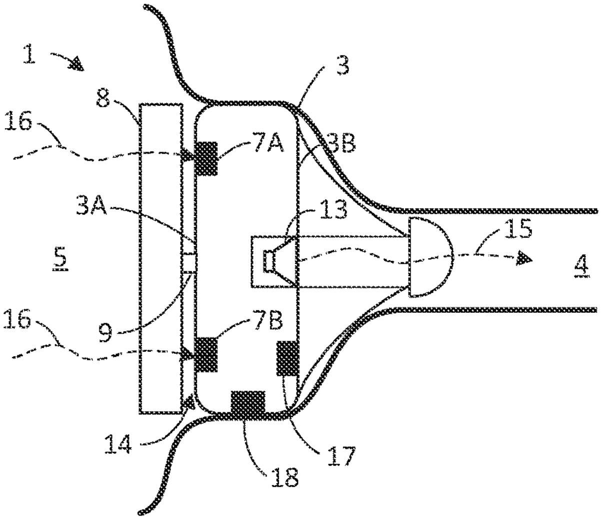
FIG. 5 shows a cross-section of an earphone device, arranged in an ear canal, in accordance with another embodiment of the first aspect.

FIG. 5 illustrates using a cross-sectional view a further embodiment of the earphone device 1. In this illustrated embodiment the earphone device 1 comprises a housing 3 that has at least a portion configured to fit into an ear canal 4 or to substantially cover the opening of an ear canal 4 of a user, wherein the housing 3 comprises a first side 3A, and a second side 3B opposite to the first side 3A. The dial 8 is rotatably attached to the first side 3A, and at least one microphone 7 is arranged in the housing 3 facing outwards from the first side 3A and configured to capture sound waves 16 from the external environment 5. A speaker 13 is also arranged in the housing 3 facing outwards from the second side 3B and configured to generate sound waves 15 for delivery towards the inside of the ear canal 4 in response to an input audio signal. The speaker 13 may comprise a front cavity and a back cavity isolated from the front cavity for optimal sound wave generation. In an embodiment, the signal components of the input audio signal may comprise the microphone signal.

The earphone 1 may further comprise a compressible eartip for secure location in the ear canal 4.

In an embodiment, the dial 8 is a volume knob arranged to adjust at least one of the overall output level of the speaker 13 or a balance between signal components of the input audio signal.

In an embodiment, the earphone device 1 comprises at least two microphones 7A, 7B arranged in the housing 3 facing outwards from the first side 3A and configured to be oriented towards the mouth of a user of the earphone device 1 to enable acoustic beamforming, as described above in relation to FIG. 2.

In an embodiment the earphone device 1 further comprises an internal microphone 17 arranged in the housing 3 facing outwards from the second side 3B and configured to capture sound waves from the direction of the auditory canal.

In a further embodiment the earphone device 1 may further comprises a voice accelerometer 18 configured to detect presence of the voice of a user 6 of the earphone device 1 via vibrations.

These additional inputs can generate further input signals that can be used as further components to be mixed in the input audio signal for the speaker, or to control other functions of the earphone device 1 (such as de-occlusion).

Figure 6:
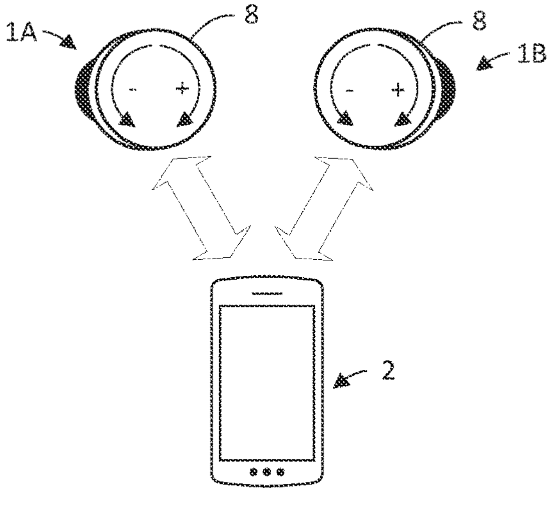
FIG. 6 shows a system with two earphone devices in data connection with a host device in accordance with an embodiment of the second aspect.

FIG. 6 shows a side view of a system according to the present disclosure comprising two earphone devices 1A and 1B in accordance with any above described embodiment, which may correspond to an implementation of a TWS earphone system configured to be used in a left and right ear of a user respectively, with no wired connection between the earphone devices 1A and 1B, and a host device 2 arranged in data connection with the at least one earphone device 1.

In this embodiment, a first earphone device 1A comprises a rotatable dial 8 as described above, and a second earphone device 1B also comprises a rotatable dial 8 as described above. Rotation of any of the dials 8 can be used to adjust the output volume of the speakers 13, or to adjust balance between signal components of the input audio signal for the speakers 13.

The host device 2 may be a mobile smartphone and the data connection may e.g. be established using a Bluetooth or Bluetooth Low Energy (BLE) protocol.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

What is claimed is:

1. An earphone device, comprising:

a housing;

at least one microphone arranged in the housing facing outwards and configured to generate a microphone signal; and a dial rotatably attached to the housing through a pivot, the dial being substantially flat and arranged to form a narrow gap between the housing and the dial, wherein the dial is further arranged to cover the at least one microphone, and wherein the pivot is arranged to limit the narrow gap to a size small enough to hinder entrances of dust particles while allowing acoustic waves to reach the at least one microphone.

2. The earphone device according to claim 1, wherein the at least one microphone comprises at least two microphones, and wherein the at least two microphones are arranged to enable acoustic beamforming towards at least one of a mouth of a user or straight ahead of a user during use of the earphone device.

3. The earphone device according to claim 1, wherein the housing is arranged with a substantially circular cross-section, and the at least one microphone comprises a plurality of angularly spaced apart microphones arranged around the circumference of the housing to enable enhancing the signal-to-noise ratio (SNR) of the microphone signal in a direction of a mouth of a user or a direction of straight ahead of a user during use of the earphone device.

4. The earphone device according to claim 1, further comprising:

at least one microphone cavity extending from a surface of the housing towards the inside of the housing, the dial being arranged to cover an opening of each microphone cavity, wherein each of the at least one microphone is arranged in a respective microphone cavity.

5. The earphone device according to claim 4, wherein the at least one microphone cavity further comprises a porous material arranged in a hollow space extending between the at least one microphone and the surface of the housing, the porous material being a wind noise resistant material configured to filter out wind noise while allowing other sounds to pass through to the at least one microphone.

6. The earphone device according to claim 1, wherein at least adjacent portions of the dial and the housing are arranged with circular cross-sections, with the pivot arranged to connect the central axes of the adjacent portions of the dial and the housing.

7. The earphone device according to claim 6, wherein the dial is arranged with a larger diameter than the housing or at least a portion of the housing adjacent to the dial, and wherein the dial further comprises a protruding rim extending in the direction of the housing and arranged to cover the gap but leaving a narrow opening between the edge of the housing and the rim to allow the acoustic waves to reach the at least one microphone.

8. The earphone device according to claim 1, further comprising:

a speaker configured to generate sound waves in response to an input audio signal, wherein the dial is a volume knob arranged to adjust at least one of the overall output level of the speaker or a balance between signal components of the input audio signal.

9. The earphone device according to claim 8, wherein the signal components of the input audio signal comprise the microphone signal.

10. The earphone device according to claim 8, wherein at least a portion of the housing is configured to fit into an ear canal or to substantially cover an opening of an ear canal of a user of the earphone device, wherein the housing comprises a first side, and a second side opposite to the first side, wherein the at least one microphone is arranged in the housing facing outwards from the first side and configured to capture sound waves from the external environment, wherein the speaker is arranged in the housing facing outwards from the second side and configured to generate the acoustic waves for delivery towards the inside of the ear canal, and wherein the dial is rotatably attached to the first side.

11. The earphone device according to claim 10, wherein the earphone device further comprises an internal microphone arranged in the housing facing outwards from the second side and configured to capture sound waves from the direction of the ear canal.

12. The earphone device according to claim 1, further comprising:

a voice accelerometer configured to detect presence of a voice of a user of the earphone device via vibrations.

13. A system, comprising:

at least one earphone device; and a host device arranged in a data connection with the at least one earphone device, wherein the at least one earphone device comprises:

a housing;

at least one microphone arranged in the housing facing outwards and configured to generate a microphone signal; and a dial rotatably attached to the housing through a pivot, the dial being substantially flat and arranged to form a narrow gap between the housing and the dial, wherein the dial is further arranged to cover the at least one microphone, and wherein the pivot is arranged to limit the narrow gap to a size small enough to hinder entrances of dust particles while allowing acoustic waves to reach the at least one microphone.

14. The system according to claim 13, wherein the at least one earphone device is a true wireless stereo (TWS) headset, the host device is a mobile smartphone, and the data connection is established using a Bluetooth protocol.

15. The system according to claim 13, wherein the at least one microphone comprises at least two microphones, and wherein the at least two microphones are arranged to enable acoustic beamforming towards at least one of a mouth of a user or straight ahead of a user during use of the at least one earphone device.

16. The system according to claim 13, wherein the housing is arranged with a substantially circular cross-section, and wherein the at least one microphone comprises a plurality of angularly spaced apart microphones arranged around the circumference of the housing to enable enhancing the signal-to-noise ratio (SNR) of the microphone signal in a direction of a mouth of a user or a direction of straight ahead of a user during use of the at least one earphone device.

17. The system according to claim 13, wherein the at least one earphone device further comprises:

at least one microphone cavity extending from a surface of the housing towards the inside of the housing, the dial being arranged to cover an opening of each microphone cavity, wherein each of the at least one microphone is arranged in a respective microphone cavity.

18. The system according to claim 17, wherein the at least one microphone cavity further comprises a porous material arranged in a hollow space extending between the at least one microphone and the surface of the housing, the porous material being a wind noise resistant material configured to filter out wind noise while allowing other sounds to pass through to the at least one microphone.

19. The system according to claim 13, wherein at least adjacent portions of the dial and the housing are arranged with circular cross-sections, with the pivot arranged to connect the central axes of the adjacent portions of the dial and the housing.

* * * * *